W. WRIGHT.
COMBINED TYPE WRITING AND COMPUTING MACHINE.
APPLICATION FILED FEB. 2, 1912.
1,265,577.
Patented May 7, 1918.
3 SHEETS—SHEET 1.
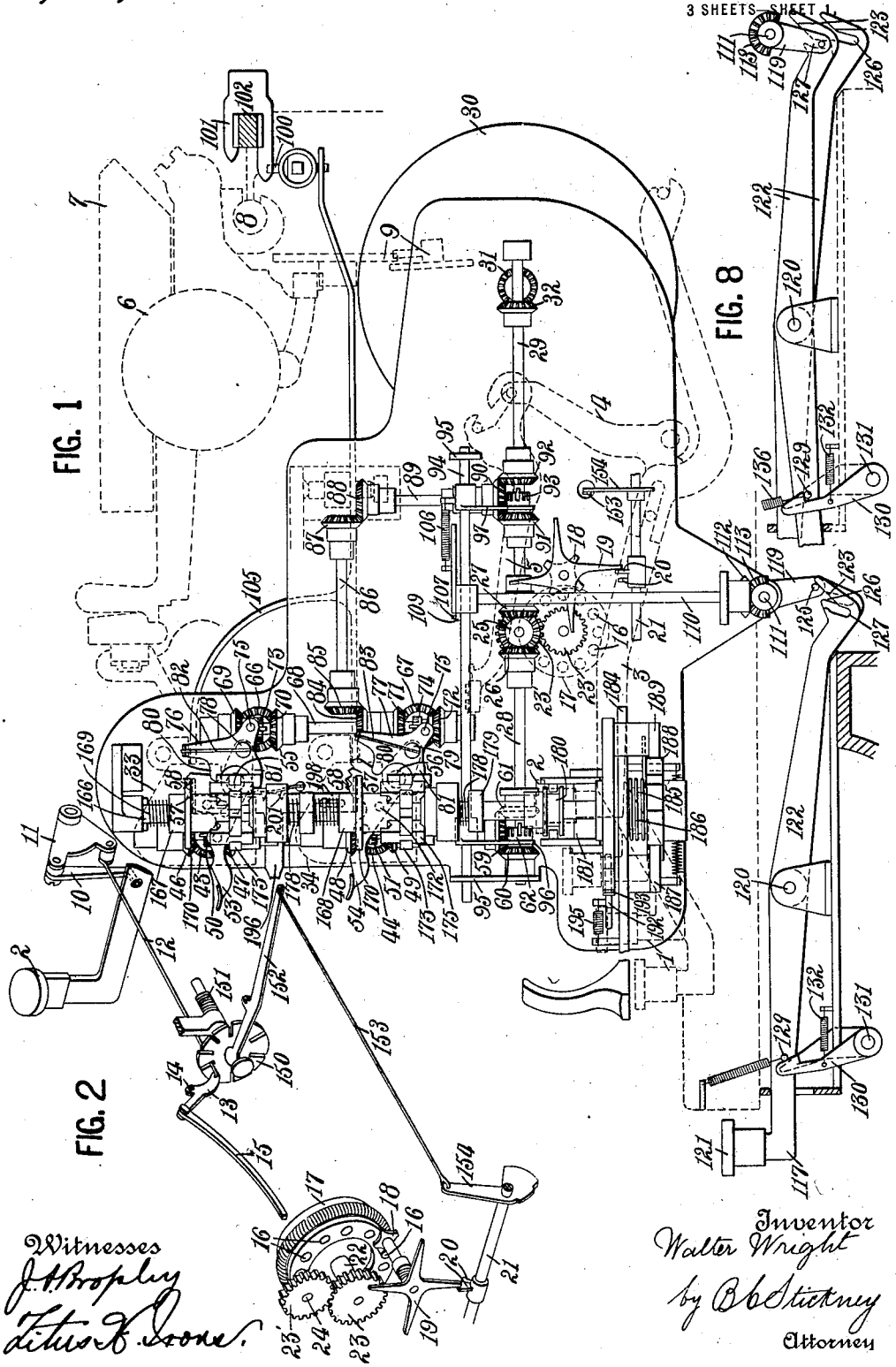
Witnesses
J. T. Brophy
Titus K. Doone
Inventor
Walter Wright
by B. C. Stickney
Attorney

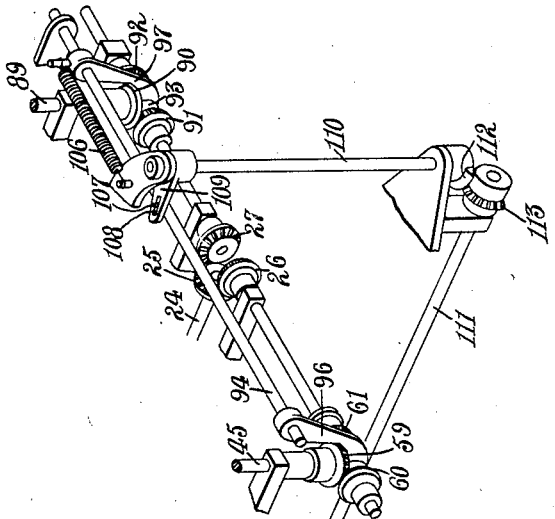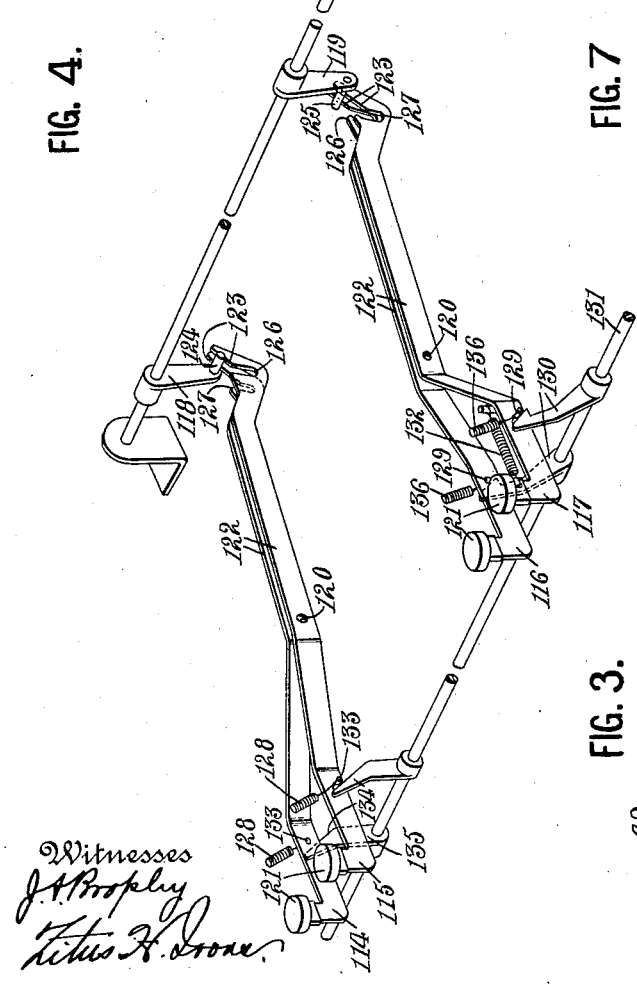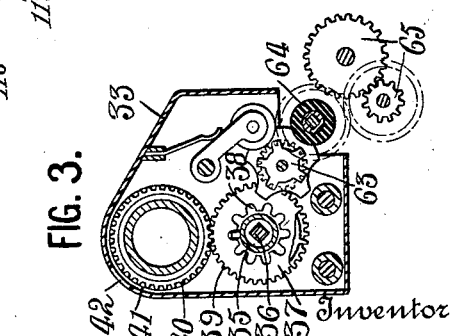

W. WRIGHT.
COMBINED TYPE WRITING AND COMPUTING MACHINE.
APPLICATION FILED FEB. 2, 1912.
1,265,577.
Patented May 7, 1918.
3 SHEETS—SHEET 3.
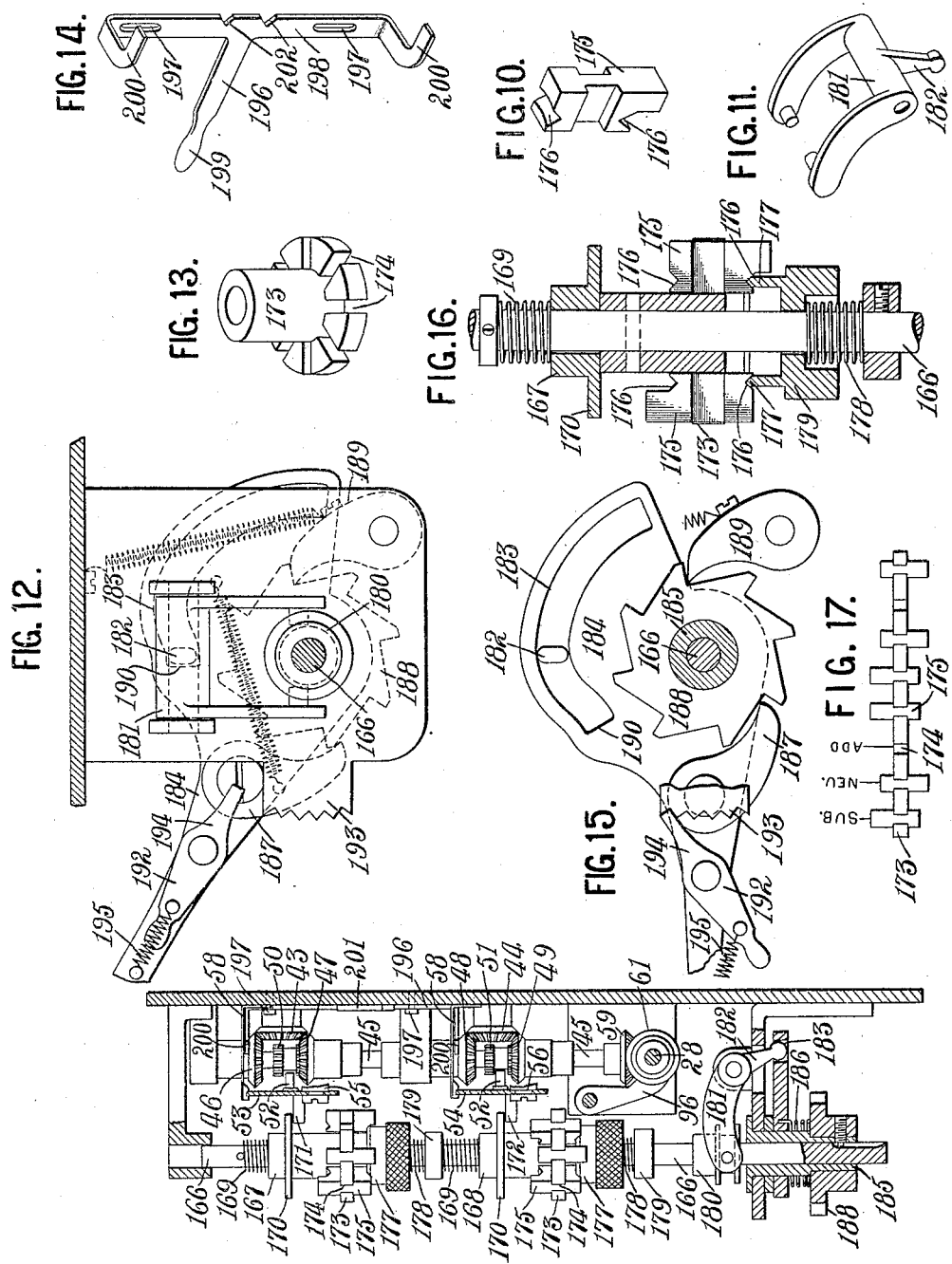

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,265,577.   Specification of Letters Patent.   Patented May 7, 1918.

Application filed February 2, 1912. Serial No. 674,901.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a temporary interrupter of predetermined controlling mechanism for a computing machine, useful in connection with combined typewriting and computing machines, such as the Underwood-Wright machine, and is an improvement on an application No. 543,603, filed February 12, 1910, by Gustave O. Degener and myself.

A feature of this invention is to provide a computing machine having a plurality of computing heads with a control to act under a certain sequence of combined states, as to adding, subtracting and neutral, according to a predetermined plan, with means for interrupting the predetermined plan of operation to either change the state of such of the computing heads as may be active to just the opposite state or to silence all of the active computing heads.

In the embodiment used to illustrate this invention, there are provided a plurality of computing heads, each having a master wheel and tens carrying mechanism. The master wheels of all of the computing heads are driven from one set of gearing, and the tens carrying mechanisms are driven from another set of gearing. Clutches at each computing head with levers for shifting the same, control the rotation and direction of rotation of the master wheels and tens carrying mechanisms, so as to control the states of the individual computing heads. Controlling mechanisms individual to each computing head are used to change the position of the accordant shifting levers, but are connected together by a shaft, so as to move in unison and thus govern concomitantly the states of all the computing heads. The controlling mechanisms are shown in the form of adjustable, reversible and interchangeable tappets of variable effect, coöperating with setters to adjust the shifting levers.

The gearing for the master wheels and the gearing for the tens carrying mechanisms are driven from a motor through the intermediary of a connecting gearing common to both the other sets of gearing, and thus common to all the computing heads. The connection, however, from the first and second gearings to the third mentioned gearing is such that the drive from the motor can be entirely interrupted, that is silenced, or can be reversed to the opposite direction to normal at this point. This is accomplished by clutches controlling the connection of the common gearing to the other two gearings which can be shifted to any one of three positions, which shifting may be accomplished in any suitable manner as by means of keys arranged in juxtaposition to the ordinary typewriter keys.

Other features and advantages will hereinafter appear.

In the accompanying drawings,

Figure 1 is a side view in elevation with parts broken away and in section to disclose the underlying structure.

Fig. 2 is a skeleton perspective view showing the connection of one of the numeral keys to the valuating mechanisms, whereby the extent of rotation of the master wheels is determined in accordance with the particular numeral key struck.

Fig. 3 is a sectional view through one of the computing heads, showing the relative arrangement of the parts thereof.

Fig. 4 is a skeleton perspective view showing the means for shifting the clutches of the common gearing, whereby the states of the computing heads may be temporarily changed, that is to say, reversed in their action or entirely silenced.

Fig. 5 is a fragmentary top plan view showing the clutches and the common or main gearing shifted to their abnormal positions, corresponding to a rotation of the actuable elements of the computing heads in a direction directly opposite to that normally determined by the governing mechanism.

Fig. 6 is a fragmentary vertical section through one of the clutches shown in Fig. 5.

Fig. 7 is a fragmentary horizontal section of the tens carrying gearing.

Fig. 8 is a fragmentary view in elevation showing one of the keys for interrupting the predetermined control of the computing heads in its actuated and locked position.

Fig. 9 is a vertical section with parts broken away to show the underlying structure and disclosing the relative arrangement of the governing mechanism embodying the individual controlling mechanisms for determining the states of the computing heads, according to a predetermined plan.

Fig. 10 is a detail perspective view of one of the tappets.

Fig. 11 is a detail perspective view of the rocker for actuating the control shaft.

Fig. 12 is a horizontal fragmentary section of the actuator for the control shaft, and the mechanism connected thereto, showing the actuator in its normal unactuated position.

Fig. 13 is a detail perspective view of one of the holders for the tappets.

Fig. 14 is a detail perspective view of the throw off for the lever latches.

Fig. 15 is a horizontal section showing certain of the parts disclosed in Fig. 12, with the actuator after it has moved a sufficient amount to depress the control shaft, but not a sufficient amount to rotate said shaft.

Fig. 16 is an enlarged vertical section showing the method of locking the tappets in place.

Fig. 17 is a developed view showing the arrangement of one series of position tappets for controlling a given cycle of operations of one of the computing heads.

Referring more particularly to the separate parts of this invention as embodied in the form shown in the drawings, 1 indicates letter keys and 2 numeral keys, which are secured to key levers 3, which operate through the intermediary of bell cranks 4, type bars 5, so as to swing the latter up against the front side of a platen 6 carried by a carriage 7, which runs on one or more rails 8. The letter-feeding movement of the carriage 7 may be obtained in the usual manner step-by-step at each actuation of a key by the release of an escapement mechanism, indicated generally by the numeral 9, which may be of the usual Underwood type.

The computing mechanism may be controlled from the numeral keys 2 in the manner described in said application No. 543,603, wherein it was shown that each numeral key lever 3 was adapted to pull down a link 10, so as to rock a bell crank 11, thereby pulling on a link 12 to swing a lever 13 about its pivot 14. The swinging of each of the levers 13, of which there is one for each numeral key, plunges a jack 15 against a corresponding pin 16 provided in a master or valuating wheel 17. The valuating wheel 17 is normally held from rotation by one of the projected pins 16 engaging an escapement wheel 18, which is secured to another escapement wheel 19 engaging one of a pair of locking stops 20 on a rock shaft 21.

The rock shaft 21 is oscillated at each actuation of a numeral key, so as to release the escapement wheels 18 and 19, and thus permit a rotation of the master or valuating wheel 17 a predetermined amount, depending upon the particular numeral key actuated, until the next projected pin 16 engages the escapement wheel 18. The rocking of the shaft 21 may be accomplished by a collar 150 being pushed back by each of the levers 13 at the actuation of a numeral key against the tension of a spring 151, so as to oscillate a lever 152 which is connected by a link 153 to an arm 154 on the shaft 21.

This mechanism, which may be termed the "escapement or valuating mechanism" for the computing mechanism, determines the extent of rotation of a shaft 22, to which the valuating wheel 17 is secured, and which is provided with a gear 23 meshing with a corresponding gear 23' on a shaft 24. The shaft 24 is also provided with a bevel gear 25 meshing with bevel gears 26 and 27 secured respectively to shafts 28 and 29. The shaft 29 is driven from a motor 30 through the intermediary of a slip clutch not shown, and also through the intermediary of intermeshing bevel gears 31 and 32, the latter of which is secured to the shaft 29. The shafts 28 and 29 form a portion of the gearing connecting the motor 30 with the gearing for driving the rotatable parts of one or more computing heads 33 and 34, of which two are shown.

Each of the computing heads is preferably of the type shown in said application No. 543,603 above-mentioned, and includes, as will be seen by reference to Fig. 3, a master wheel 35 splined on a shaft 36, so as to have a movement relative to a series of computing wheels 37, whereby it will be capable of engaging with the internal gears 38 provided by the inwardly projecting teeth of these computing wheels, thus enabling the master wheel to successively actuate each of these computing wheels. The relative movement of the master wheel and the computing wheels may be obtained in any suitable manner, as for example that described in my copending application No. 574,813 filed August 1, 1910, whereby the master wheels are manipulated step-by-step at each new column by a lever 105 provided with an automatic catch 100, which is engaged and operated by a series of column stops 101 carried by a rack 102 on the carriage 7. These computing wheels are also provided with external teeth forming external gears 39 meshing with the gears 40 carrying the dial wheels 41, so that the numerals marked on the dial wheels will be exhibited through an opening 42 in the casing of each computing head, thereby showing the particular computation run up by the numeral keys.

Each of the shafts 36 for the computing heads 33 and 34 is provided with a bevel gear, indicated for the respective computing heads by the numerals 43 and 44. These bevel gears each mesh with a pair of bevel gears loosely mounted on a shaft 45 and faced in opposite directions, so as to be capable of rotating the gears 43 and 44 in opposite directions, according to which member of the pair is rotated. To connect the pairs of bevel gears, which are indicated by the numerals 46, 47, 48 and 49, in driving relation with the shaft 45, there are provided clutches 50 and 51 splined on the shaft 45, so as to be shiftable to cause the teeth provided on opposite ends thereof to engage with corresponding teeth on the inwardly facing sides of each member of the pairs of bevel gears.

Each of the clutches is provided with a circular groove, so as to be engaged by pins 52 carried by shifting levers 53 and 54. The shifting levers 53 and 54 are pivoted respectively at 55 and 56 by means of pins, and are capable of occupying any one of three positions corresponding to the connection of each of the gears of a pair in driving relation with the shaft 45, and also with a neutral position in which neither gear of the pair is in driving relation with the shaft 45. To secure the levers 53 and 54 in any position of adjustment, they are provided with a plurality of notches 57, preferably three in number, which are engaged by spring detents 58.

To connect the shaft 45 with the shaft 28 so that there will be an unbroken drive between the motor 30 and the master wheels 35, the shaft 45 has secured thereto a bevel gear 59, which meshes with a pair of oppositely facing bevel gears 60 and 61 loosely mounted on the shaft 28, but capable of being connected in driving relation therewith by a clutch 62, which is splined on the shaft 28, and has teeth on opposite ends thereof capable of engaging with corresponding teeth on the inwardly facing sides of the gears 60 and 61.

In the type of computing head shown herewith, it is essential to transfer a complete rotation of one of the lower computing wheels 37 to a partial rotation of the next highest computing wheel in the series. For this purpose, there is provided a tens carrying mechanism indicated in general by the numeral 63 (Fig. 3,) which depends for its action, as described in said application No. 543,603, on the rotation and direction of rotation of a rubber roller 64. This rubber roller 64, in the case of computing heads 33 and 34, respectively, is connected to bevel gears 66 and 67 by a train of gearing, described in said application No. 543,603, and indicated in general by the numeral 65. The bevel gears 66 and 67 mesh with pairs of bevel gears loosely mounted on a shaft 68, and indicated by the numerals 69, 70, 71 and 72. The pairs of bevel gears may be connected in driving relation with the shaft 68, so as to drive the bevel gears 66 and 67 in different directions by means of clutches 73 and 74, which are splined on the shaft 68, and capable of being slid, so that the teeth on opposite ends thereof will engage with corresponding teeth on the inwardly facing sides of each member of the pair of gears. The clutches 73 and 74 are provided with circular grooves engaged by pins 75 mounted on supplementary levers 76 and 77, which are pivoted respectively on pins 78 and 79 secured respectively to the main shifting levers 53 and 54. These supplementary levers are each provided with a pair of fingers 80 and 81 projecting on opposite sides of the pivot pins 55 and 56, so as to permit a limited motion of the supplementary levers relative to the main shifting levers. This limited motion or play may be taken up by springs 82 and 83, which are secured at one end to the supplementary levers and at the other end to the pins 78 and 79. It will thus be seen that, by a simple movement of one of the levers 53 and 54, both of the clutches controlling the rotation and direction of rotation of both the master wheel and the tens carrying mechanism of a computing head can be simultaneously shifted, and thereby form a controlling mechanism for the state of the computing head, as to adding, subtracting or remaining neutral or inactive.

The shaft 68 may be also driven from the motor 30 by being provided with a bevel gear 84, which meshes with a bevel gear 85 secured on a counter shaft 86, which has a bevel gear 87 meshing with a bevel gear 88 on a shaft 89. The shaft 89 may be driven from the shaft 29, which as has been stated before is driven from the motor 30, by being provided with a gear 90 fixed thereon and meshing with both members of a pair of gears 91 and 92 loosely mounted on the shaft 29, and facing in opposite directions, so as to be capable of driving the shaft 89 in opposite directions.

To connect the gears 91 and 92 in driving relation with the shaft 29, there is located between them a clutch 93 splined on the shaft 29 and shiftable from a position with its teeth on one end in engagement with corresponding teeth on the inner side of the gear 91 to a position with the teeth on the opposite end thereof in engagement with corresponding teeth on the inner face of the gear 92.

We now come to the mechanism which is used to obtain a predetermined sequence of operations by the computing heads, in an automatic manner, by the simple shifting of a hand actuator. Arranged in juxtaposition to the shift levers 53 and 54, there is provided a control shaft 166, which is supported so as to be capable of having both an endwise reciprocating movement and a rotary movement. Adjacent each of the shifting levers 53 and 54, the control shaft 166 is provided with setters 167 and 168, shown in the form of collars normally held in their lowermost position by means of springs 169. These collars are provided with circular flanges 170 which overlie pins 171 and 172 secured to the shift levers 53 and 54, so that when the shaft 166 is depressed, these flanges will engage the pins 171 and 172, and force the shifting levers 53 and 54 to their lowermost position corresponding to adding.

Underlying each of the setters 167 and 168 there is provided a holder 173, which is shown in detail in Fig. 13 as provided with a series of radial slots 174 formed in a circular flange extending from the body portion of the holder. These slots are capable of receiving control tappets 175, one of which is shown in detail in Fig. 10. The tappets 175 are preferably reduced at the point where they enter the slots 174, so as to prevent movement in a vertical direction of the tappets relative to their holder. That is to say, the tappets are provided with grooves in their sides forming shoulders which engage the circular flange projecting from the body portion of the holder. In order to secure these tappets in position on the holder, so that they may not slip off by accident, in a radial direction, they are provided with grooves 176 in which a circular detent 177 may enter. This detent is slidingly mounted on the shaft 166, and normally held in its engaging position by a spring 178 which abuts against a collar 179 secured to the shaft 166 as well as against the detent 177. A portion of the outer surface of the detent 177 may be roughened or knurled so as to permit it to be more readily handled.

It will be seen, by reference to Figs. 10 and 16, that the extreme top and bottom limits of the tappets 175 are located at unequal distances from the grooves provided in the sides of the tappets, so that if a tappet is reversed in the holder, it will project a different extent above the circular flange of the holder than it did before. The extent of projection of the tappet above the flanges with the holder determines the extent to which it will shift the corresponding shifting lever 53 from an adding position. In order that the tappets may be used in either position they are provided with the grooves 176 at both their top and bottom so that the detent 177 will hold them in either position. The tappets may also be interchanged one with the other.

It will be seen that if one of the tappets is located beneath one of the pins 171 and 172, when the shaft 166 returns to its normal raised position, that it will shift this pin, and thus the shifting lever to which it is secured, a given distance according to whether the larger or smaller end of the tappet is located above the flange of the holder. If the smaller end of the tappet, corresponding to the top end shown in Fig. 10, is located uppermost, the shifting lever will be only moved back to a neutral position. If, however, the larger end of the tappet, corresponding to the lower end in Fig. 10, is at the top, it will force the lever up to its highest limit corresponding to a subtracting position. Of course, if at any particular point a tappet is omitted, the lever will be allowed to remain in its lowermost position corresponding to adding.

It will thus be seen that, by arranging the controlling tappets around the holder, and giving the holder a combined movement, such that it will bring the tappets successively in operative contact with the pins 171 and 172, any predetermined sequence of operations of the computing heads may be obtained. In Fig. 17, a development of one arrangement of tappets in the holder is shown. Taken from left to right, the first tappet will force the shifting lever to a substracting position, the second tappet to a neutral position, lack of a tappet in the third place will leave it at an adding position, and so on.

In order to obtain a reciprocating, rotary motion of the shaft 166, necessary to successively operate the shifting levers 53 and 54 together with the supplementary levers operated thereby, the shaft 166 is provided, adjacent its lower end, with a grooved shifting collar 180, engaged by a rocker 181 shown in the form of a bell crank lever, having one arm 182 rounded to form a follower which will engage the sides of a cam slot 183 provided in an actuator 184, shown in the form of a lever mounted to rotate loosely on a collar 185 splined on the shaft 166. The actuator 184 is normally held in its unactuated position, corresponding to that shown in Fig. 12, by means of a spring 186. The actuator 184 is not only used to reciprocate the shaft 166, but also to rotate this shaft. This is accomplished by means of a spring-pressed pawl 187 pivotally mounted on the actuator 184, and adapted to engage the teeth of a ratchet wheel 188 splined on the shaft 166. The ratchet wheel 188, and thus the shaft 166, is prevented from backward rotation by means of a spring-pressed detent or dog 189.

The relation of the pawl 187 with the ratchet wheel, as shown in Fig. 12, is such that there will be an appreciable swing of the actuator 184 before it starts to rotate the shaft 166, by engagement with one of the teeth of the ratchet wheel 188. This ineffective throw or play of the actuator is taken advantage of to slide the shaft 166 down to its lowermost position. To accomplish this result, the cam slot 183 from the beginning, indicated at 190, to a point, (see Fig. 15) changes rather abruptly so as to swing the follower 182 from its innermost to its outermost position, whereby the shaft 166 will be drawn from its uppermost position to its lowermost position, that is to say, from the position shown in Fig. 1 to the position shown in Fig. 9. For the remainder of the stroke of the actuator 184, the pawl 187 engages a tooth of the ratchet wheel 188 just long enough to bring the next slot 174 in the holders 173 underneath the pins 171 and 172. If this slot contains a tappet, the pin or pins will be shifted to a position corresponding to either neutral or subtracting. If the slots do not contain tappets, the pins will remain at the adding position. During this latter part of the initial stroke of the actuator 184, the follower 182 is substantially unactuated, because of the fact that the remainder of the cam slot 183 is substantially circular, with the axis of the shaft 166 as a center.

The actuator 184 is automatically thrown back by the spring 186, so as to return to the position shown in Fig. 12. During this movement this cam slot 183 travels so as to leave the follower unactuated until the actuator has almost reached its normal position, and then, for the last fraction of the return stroke, shifts the shaft 166 back up into its normal position so that whatever tappets are beneath the pins 171 and 172, they will engage the same and shift the levers to which they are connected to the positions corresponding to the tappets.

To avoid danger of the typist throwing the actuator a fraction of a stroke, there is provided a two-way acting lock 192, which is of such a character that the actuator must be swung its full stroke in one direction before it will be permitted to return, and also so that the actuator cannot be partially returned and then swung out again. In this case this two-way lock is shown in the form of a two-way ratchet bar 193 engaged by a pawl 194 pivotally mounted on the actuator 184 in such a manner that it can swing to either side of its pivot, and when in engagement with the ratchet bar 193 will prevent a return of the actuator until the pawl has traveled over the full length of the ratchet bar. The pawl 194 is held by a spring 195, which is so arranged that it will cause the pawl to engage the ratchet bar positively in whichever direction the actuator 184 is traveling.

When the automatic hand mechanism is in operation it is desirable to relieve it of any unnecessary retarding action or friction. It therefore may be advisable to remove the latches 58 from engagement with the notches 57. For this purpose, there is provided a throw-off 196, shown in detail in Fig. 14, which is slidingly mounted by means of one or more pin-and-slot connections 197, and is shown in the form of a bar 198 having an operating handle 199 extending from one side thereof and a plurality of arms 200, one for each of the latches 58, which underlie the same and are adapted to lift said latches from engagement with said notches 57, when the throw-off is moved to its uppermost position. The throw-off 196 may be held in either position of adjustment by a spring catch 201, which engages any one of a plurality of notches 202 provided in the edge of the bar 198.

It is often desirable to temporarily stop the computing of the machine or to reverse the action of the active computing heads, for the purpose of making a correction. In such cases, it is not desirable to disturb the controlling mechanisms which give the predetermined sequence of operations, even if it were possible to immediately effect a silencing or reversal of all of the computing heads thereby. Means is therefore provided whereby the states of all the computing heads can be changed to just the opposite states, if adding or subtracting, or silenced by controlling the drive from the motor to the actuable elements of the computing heads at a point common to all computing heads, and nearer the motor than the point where the shifting levers 53 and 54 control the drive to the individual head. This is done by shifting both the clutches 62 and 93 from their normal positions shown in Fig. 1 to one or the other of their other positions; one of which is shown in Fig. 5.

For this purpose, a shifter 94 is provided, which is shown in the form of a rod slidingly mounted in bearings 95, and having a pair of arms 96 and 97, which engage in circular grooves in the clutches 62 and 93.

The shifter 94 is normally held in the position illustrated in Fig. 1 by a spring 106. To manipulate the shifter 94 to a neutral or a reversed position, there is provided a pin 107 on the rod of the shifter, which engages a slot 108 in an arm 109 secured to a shaft 110. The shaft 110 may be actuated from a shaft 111 through the intermediary of intermeshing fragmentary bevel gears 112, 113, fixed respectively on the shafts 110 and 111. To rock the shaft 111, and thus manipulate the shifter 94, there are provided a plurality of keys 114, 115, 116 and 117. The keys 114 and 115 operate the shaft 111 by means of a crank 118 thereon, and the keys 116 and 117 operate said shaft 111 by a crank 119 thereon.

Each of the keys 114 to 117 is pivoted intermediate its ends, as at 120, and comprises the usual finger rests 121 and levers 122. All of these keys are provided adjacent their rear end with cam edges 123, engaging pins 124 and 125 located respectively on the cranks 118 and 119. These cam edges, on an actuation of any one of the keys, are adapted to rock the cranks 118 and 119, and thus the shaft 111, until the pin 124 or 125 enters into the particular slot 126 or 127 of the key operated. It will be noted that the slots 126 and 127 will lock the shaft 111 against further rotation after they have once engaged with the pins 124 and 125. It will be further noted that the inclined cam edges 123 leading to the slots 126 and 127 are longer in the case of the slots 127 than in the case of the slots 126, so that the shaft 111 will be rotated an appreciably greater distance, before it is stopped, by entering the slot 127. The reason for this is that the shifter 94 is manipulated different distances according to whether it is desired to merely bring the clutches 62 and 93 out of engagement with the clutch faces with which they are normally held by the spring 106, or whether it is desired to entirely shift the clutches 62 and 93 to their opposite limit of travel into engagement with the gears 61 and 92.

The keys 115 and 116, which are provided with the slots 126, merely shift the clutches 62 and 93 to an intermediate or neutral position which corresponds with the disconnection or interruption of the drive from the motor to the actuating mechanism of the computing heads embodied in the master wheels and tens carrying mechanisms. These keys are therefore called the silencing keys.

The other keys 114 and 117, which are provided with the slots 127, will manipulate the shifter 94 to the extreme limit of its throw, so as to reverse the drive from the motor to the computing heads. These keys are hence called reversing keys.

The keys 114 and 115, after once being depressed, are automatically returned to their normal positions by springs 128. These keys are hence called temporary reversing and silencing keys, because their action is merely in effect while the operator holds them in their depressed position.

The keys 116 and 117, however, when once depressed, are secured in their depressed positions by locking mechanism, which is shown in this instance to comprise pins 129 located on the sides of the key levers which are engaged by latches 130 secured to a rod 131. These latches 130 are normally held in position to engage the pins 129 by a spring 132.

If it is desired to disengage the locking mechanism so as to release whichever one of the permanent or semi-permanent keys 116 and 117 which happens to have been depressed, it is merely necessary to depress the corresponding one of the temporary keys 114 and 115, when pins 133 secured to the side of the levers for the keys 114 and 115 will engage cam edges 134 of arms 135 secured to the rock shaft or rod 131. The movement of one of these keys 114 and 115 will thus swing the latches 130 from engagement with the pins 129 on the key which happens to be depressed, so that this key may be returned by its spring 136, one of which is provided for each of the permanent keys 116 and 117.

In using the device, the tappets 75 are arranged on the holders 73 with larger or smaller ends uppermost, and according to any desired plan, in the slots 74; some slots being without tappets if it is desired to add at the instant when such slots come into coöperation with the shifting mechanisms of the accordant computing head. The controlling mechanisms, individual to each computing head, are thus arranged previously to give a predetermined sequence of operations of the computing heads at predetermined points, corresponding if desired, to certain columns in the matter being written on the worksheet on the platen.

The setters 170 coöperate with the tappets when the shaft 166 is alternately reciprocated and rotated to adjust the levers of the shifting mechanisms as often as the actuator 84 is actuated. If, at any time, it should be desired to temporarily reverse the states of the computing heads, as determined at any particular point by the individual controlling mechanisms therefor, it will merely be necessary to depress the key 114 when the clutches 62 and 93 will be slid from Fig. 1 position to the position shown in Fig. 5, reversing the drive from the motor to the actuable elements of the computing heads, including the master wheels and the tens carrying mechanisms. Any computing head having its shifting lever in a position corresponding to either adding or subtracting, while this key 114 is held depressed, will be actuated in just the opposite manner, that is regarding adding or subtracting, to that determined by the position of its shifting lever 53 or 54. Of course, if either of the shifting levers is in its neutral position, there will be no change in the state of the associated computing head.

If it should be desired to temporarily silence all of the computing heads, it will be merely necessary to depress the key 115 when the actuable elements of all the computing heads would be disconnected from the driving relation with the motor by the clutches 62 and 93 occupying an intermediate position out of mesh with all of the gears 60, 61, 91 and 92. If a semi-permanent silencing or reversing of states of all the active computing heads is desired, the key 116 or 117 respectively, may be depressed, when it will be held in its depressed position by one of the latches 130, until subsequently released by the accordant temporary key 114 or 115.

It will thus be seen that a plurality of computing heads can be controlled by this mechanism to operate under certain combinations of states, according to a predetermined plan, but that the states determined according to that plan can be reversed or changed by silencing the computing heads at any time by the operation of the desired one of the keys 114 to 117.

Variations may be resorted to within the scope of the invention, and portions of the improvements may be used without others.

Having thus described my invention, I claim:

1. The combination with a plurality of computing heads, of controlling mechanisms individual to each head and connected to move in unison, so as to produce a predetermined sequence of combinations of states of said computing heads, and means actuable at any point of the manipulation of said controlling mechanisms to produce states of said computing heads other than those determined at the particular point by said controlling mechanisms.

2. The combination with a plurality of computing heads, of clutches for determining the state of said computing heads, levers for shifting said clutches, controlling mechanisms individual to each head for adjusting said levers, additional clutches for determining the state of said computing heads free from control by said controlling mechanisms, and shifting means for moving said last-mentioned clutches independently of said first-mentioned clutches, thereby rendering the said controlling mechanisms ineffective on said computing heads.

3. The combination with a plurality of computing heads, of controlling mechanisms individual to each head for governing the state thereof, means for actuating said controlling mechanisms in unison, so as to concomitantly govern the state of all of said computing heads, and means capable of changing the states of said computing heads at any particular instant to states other than those determined by said controlling mechanisms.

4. The combination with a plurality of computing heads having certain actuable parts, of a motor for driving said actuable parts, gearing for connecting said motor to said actuable parts, means connected to said gearing at a plurality of points to determine the states of said computing heads by governing the rotation and direction of rotation of said actuable parts, mechanism connected to certain parts of said determining means for automatically actuating said means according to a predetermined sequence to obtain a predetermined series of combinations of states of said computing heads, and means for actuating certain parts of said first-mentioned means to obtain at will other states than the predetermined states selected by said mechanism.

5. The combination with a plurality of computing heads, of gearing for driving all of said computing heads and for controlling the drive and direction of drive of each computing head, controlling mechanism for automatically governing the drive of said computing heads by said gearing according to a predetermined plan, and reversing mechanism for controlling the direction of drive of said gearing, said reversing mechanism dominating said controlling mechanism.

6. The combination with a plurality of computing heads, of a manual means for controlling automatically the states of said computing heads according to a predetermined plan, a series of keys and means operated thereby for selectively controlling the states of said computing heads, to obtain other states than those determined by said manual means.

7. The combination with a plurality of computing heads, of a manual means for controlling the states of said computing heads automatically according to a predetermined plan, a series of keys and means operated thereby for selectively controlling the states of said computing heads, to obtain other states than those determined by said manual means, certain of said keys controlling different states from those controlled by certain others of said keys.

8. The combination with a typewriting mechanism including a traveling carriage, of a computing mechanism including a computing head, a controlling mechanism arranged to automatically govern the state of said computing head for a series of predetermined states corresponding with different denominational or computing columns determined by the position of the carriage, said controlling mechanism being independent of the travel of the carriage, and means for interrupting at any point in the travel of the carriage, the predetermined state of the computing head as determined by said controlling mechanism, while maintaining said controlling mechanism in such condition that the states determined thereby can be reverted to after said interrupting means ceases to act.

9. The combination with a typewriting mechanism including a traveling carriage, of a computing mechanism including a plurality of computing heads, controlling mechanism for automatically obtaining a predetermined set of states of said computing heads to correspond with different computing zones or columns as determined by the travel of said carriage, said controlling mechanism being independent in its manipulation of the travel of said carriage, and manual means for interrupting at will the predetermined states of said computing heads as determined by said controlling mechanism while maintaining said controlling mechanism in such condition that the states determined thereby can be reverted to after said interrupting means ceases to act.

10. The combination with a computing head, of a clutch for determining the state of said computing head, a lever for shifting said clutch, a controlling mechanism for adjusting said lever, and controlling means actuable at any point in the movement of said controlling mechanism to produce a state of said computing head other than that determined by said controlling mechanism at such particular point.

11. The combination with a typewriting mechanism including a traveling carriage of a computing head, a predetermined control for automatically obtaining successive states of said computing head corresponding with different computing zones or columns as determined by the travel of said carriage, said predetermined control being independent of the travel of the carriage, and means for enabling a state of said computing head different from the state determined by said predetermined control at any point in the movement of said control, and in any computing zone or column as determined by the travel of said carriage.

12. The combination with a plurality of computing heads, of a key-controlled indexing mechanism, a plurality of reversing gears between said indexing mechanism and said computing heads, one of said reversing gears for each computing head, an additional reversing gear between said indexing mechanism and said computing heads and common to said computing heads, a manually-operable device for controlling the last-mentioned reversing gear, and means individual to the reversing gears in said plurality for controlling individually the states of said computing heads; said individual controlling means connected to move in unison so as to produce a predetermined sequence of combinations of states of said computing heads, such states being simultaneously changeable by the manipulation of said common reversing gear.

13. The combination with a plurality of computing heads, of a key-controlled indexing mechanism, a plurality of reversing gears between said indexing mechanism and said computing heads, one of said reversing gears for each computing head, an additional reversing gear between said indexing mechanism and said computing heads and common to said computing heads, a manually-operable device for controlling the last-mentioned reversing gear, means individual to the reversing gears in said plurality for controlling individually the states of said computing heads; said individual controlling means connected to move in unison so as to produce a predetermined sequence of combinations of states of said computing heads, such states being simultaneously changeable by the manipulation of said common reversing gear, and manual means for operating said individual controlling means in unison at will.

14. The combination with one or more computing units, of a motor for driving said computing units, a train of gearing between said motor and said computing units involving a plurality of change-gear points of interruption whereby the drive and direction of drive from said motor to said computing units can be controlled, a predetermined sequence-controlling mechanism dominating at least one of said change-gear points of interruption so as to afford a predetermined set of successive states of said computing units by changing the drive and direction of drive of said computing units by said motor, and a manually-operative controlling mechanism dominating at will another of said change-gear points of interruption so as to vary the drive and direction of drive of said computing units by said motor.

15. The combination with a plurality of computing units, of a motor for driving said computing units, a train of gearing connecting said motor with all of said computing units involving a plurality of change-gear points of variation and interruption, one of which is provided for each of said computing units, and another of which is provided common to all of said computing units, a predetermined sequence-controlling mechanism dominating all of the change-gear points of variation and interruption for the computing units individually, and a separate controlling mechanism for dominating the change-gear point of interruption and variation common to all of the computing units, whereby the drive of the computing units from the motor can be varied according to a predetermined plan, and according to a selection at will independent of the predetermined plan.

16. The combination with a plurality of computing units, of a master member, connections therefrom to dominate the states of all of said computing units, a second master member, and connections from said second master member for dominating the states of all of said computing units at a point other than that under the control of said first master lever, so that the former can remain passive for a change in states under the control of the latter, and vice versa.

17. The combination with a plurality of computing units, of two separate manual controlling mechanisms acting individually on all said computing units to control the states thereof in unison, one giving a predetermined control accordant to a predetermined plan, and the other an undetermined control.

18. The combination with a plurality of computing units, of a joint controlling mechanism for all computing units, and a universal controlling mechanism for said computing units acting at a point distant therefrom to govern the states thereof.

19. The combination with a plurality of computing units having traveling elements, of a joint controlling mechanism acting as a unit on all computing units to govern the states thereof, and acting independent of the travel of said traveling elements, and an auxiliary controlling mechanism common to all computing units acting independent of the travel of said traveling elements to determine the states of said computing units.

20. In a computing machine, the combination with a plurality of computing heads, of manual means for individually controlling the state of each head, automatic controlling means for controlling the states of all of said heads according to a predetermined plan, and means for reversing the states of all active computing heads whether set under control of said manual means or said automatic means.

21. In a computing machine, the combination with a plurality of computing heads, of controlling mechanism individual to each head for governing the state thereof, means for actuating said controlling mechanisms individually, means for automatically actuating said controlling mechanisms in unison, so as to concomitantly govern the states of all of said computing heads, and means actuable to change the states of said heads at will to states other than those determined by either said individually actuating means or said unison actuating means.

22. In a computing machine, the combination with a plurality of computing heads, of controlling mechanism individual to each head for determining its state, means for manipulating each controlling mechanism at will, means connecting said individual controlling mechanisms to move in unison, means for actuating said connecting means, so as to produce a predetermined sequence of combinations of states of said computing heads, and means actuable at will to produce states of said computing heads other than those determined by either said individual means or said connecting means.

WALTER WRIGHT.

Witnesses:
K. FRANKFORT,
B. GOLDBERG.

Copies of this patent may be obtained for five cents each, by addressing the "Commissioner of Patents, Washington, D. C."